United States Patent [19]
Phillips et al.

[11] 4,220,289
[45] Sep. 2, 1980

[54] FORAGE CONVEYING APPARATUS

[75] Inventors: Frederick W. Phillips, Leola; Edward H. Priepke, Stevens; Robert A. Wagstaff, New Holland, all of Pa.

[73] Assignee: Sperry Corporation, New Holland, Pa.

[21] Appl. No.: 26,500

[22] Filed: Apr. 3, 1979

[51] Int. Cl.³ .............................................. B02C 18/22
[52] U.S. Cl. .................................. 241/60; 241/101.7; 241/222
[58] Field of Search ..................... 406/101; 241/57, 58, 241/60, 101.7, 221, 222

[56] References Cited
U.S. PATENT DOCUMENTS

| 2,835,256 | 5/1958 | Rogers et al. | 406/101 X |
| 4,033,518 | 7/1977 | Fleming et al. | 241/101.7 X |

FOREIGN PATENT DOCUMENTS 676598  2/1930  France ........................... 406/101

Primary Examiner—Mark Rosenbaum
Attorney, Agent, or Firm—Frank A. Seemar; Ralph D'Alessandro; Larry W. Miller

[57] ABSTRACT

Forage conveying apparatus for a forage harvester having a longitudinally extending frame supported by at least one pair of transversely spaced wheels. A cutterhead unit mounted on the frame includes a housing having a rear crop outlet. Within the housing a shear bar is mounted adjacent the path of the knives of a transverse cylindrical cutterhead rotatably mounted in cooperative relationship with the shear bar for cutting crop material fed thereto. Mounted on the frame rearwardly of the cutterhead unit is a blower unit with a housing having a crop inlet in communication with the crop outlet of the cutterhead unit. The blower includes a rotatably mounted conical base plate and blades mounted thereon for rotation within the housing in a generally circular path about an inclined axis.

12 Claims, 4 Drawing Figures

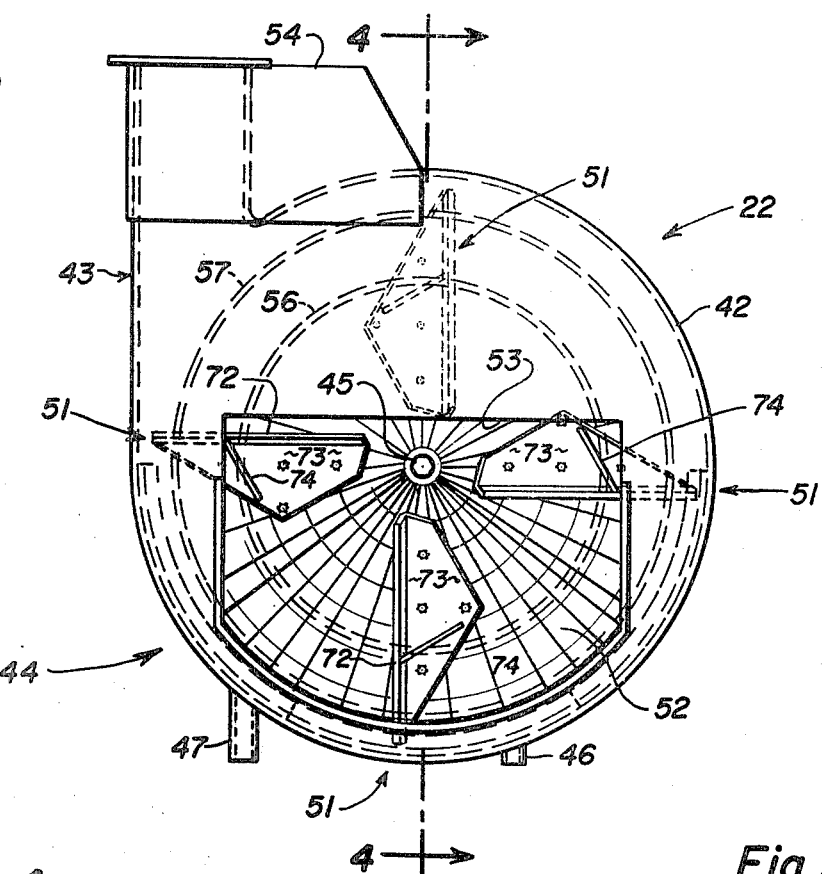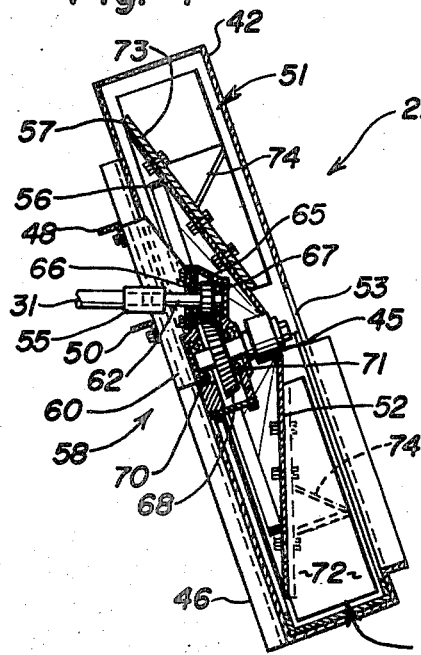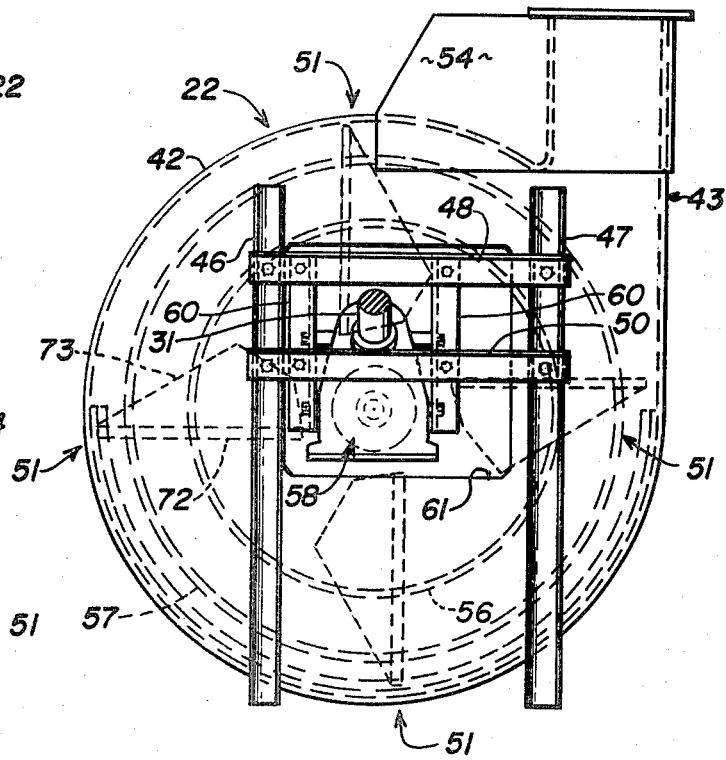

FORAGE CONVEYING APPARATUS

BACKGROUND OF THE INVENTION

The present invention relates generally to forage conveying apparatus and more particularly to a new and improved blower for forage harvester machines.

The well known agricultural practice of forage harvesting consists of cutting either green or mature crop material into discrete particles and conveying them from the field to a storage silo where they undergo an acid fermentation to give them an agreeable flavor and to prevent spoilage. This operation, which is commonly referred to as an ensilage process, converts standing crop in the field to livestock feed, commonly referred to as silage. An essential piece of farm machinery used for producing silage is the forage harvester which is adapted to gather crop material from the field, cut it into small particles and then convey the cut crop material to a temporary storage bin or wagon. Harvesters of this type are either self-propelled or pulled by a tractor. Typically, forage harvesters have a rotary cutter of a generally cylindrical configuration with knives peripherally mounted to cooperate with a fixed shear bar for cutting material as it is passed across the surface of the bar. An optional perforated recutter screen is used under some conditions to reduce the size of the cut crop even further when desirable.

Most forage harvesters are provided with a blower to convey the cut crop to a wagon towed behind or along side the harvester for receiving the crop. In some prior art arrangements, cut crop material is transferred to the blower from the cutterhead by intermediate conveyor means such as a single or side-by-side augers at right angles to the axis of the rotary cutter. Problems have been encountered in some instances with this type of mechanism when material accumulates unevenly along the augers and causes clogging. From a design standpoint, augers provide extra moving parts that are subject to wear and thereby reduce overall reliability and serviceability characteristics of the harvester. Furthermore, use of augers or any type of conveyor system increases the power requirements of the harvester especially in crop material having a high moisture content.

To overcome problems of this nature some prior art forage harvesters have been designed with cutterheads discharging material directly to the blower without intermediate conveying means. In these direct discharge machines the blower fan is of a conventional nature and rotates about an axis horizontal to the ground. The blower unit receives material fed from the cutterhead to the interior of a blower housing. The material drops to the bottom of the housing whereupon fan blades engage the material to convey it upwardly through a spout and thence to a bin or wagon.

More particularly, in forage conveying apparatus, such as forage harvesters with or without intermediate conveyor means, the blower unit comprises a fan mounted for rotation either about a transverse axis or a generally longitudinal axis. The fan commonly comprises a plurality of blades extending from a rotatably mounted center element, such as a hub or disc, within a cylindrical housing. In harvesters where material is fed directly into the blower from the cutterhead the blades urge crop material along a path in the peripheral area of the cylindrical housing until it reaches a transition member through which it exits tangentially in an airborne state. Material so fed randomly enters via an opening in the housing either in the path of the blades or against the hub, or against the housing inner walls to drop by gravity to the peripheral path of the blades, etc.

In blower units of the type described above the fan is commonly journalled for rotation in the side walls of the housing. A gear box associated with the shaft on which the blades are mounted, provides appropriate coupling to an exterior drive source, such as a tractor PTO or the like. The fan can be journalled in bearing assemblies on either or both side walls of the housing. In those instances where only one side of the blower shaft is supported, for optimum design purposes, it is best to locate the gearbox as close as possible to the fan shaft.

SUMMARY OF THE INVENTION

Accordingly, it is a principal object of the present invention to provide improved forage conveying apparatus having a unique configuration of components resulting in a simple, efficient and economical operation.

A more particular object is to provide novel forage blower apparatus adapted to receive forage material conveyed thereto and to handle it in a manner more effective and efficient than heretofore known.

In pursuance of these and other objects, the present invention contemplates new and improved forage conveying apparatus in which unique blower structure is utilized with other conventional crop handling means to improve the overall efficiency and effectiveness of the apparatus while permitting various other related design and economical advantages conducive to significant advances in the practice of forage blowing.

In one embodiment the forage conveying apparatus comprises a ground supported longitudinally extending mobile frame having crop handling means such as a cutterhead unit mounted on the forward portion thereof. The cutterhead unit includes a shear bar and a generally cylindrical cutterhead rotatably mounted adjacent the shear bar in cooperative relationship for cutting crop material and propelling it rearwardly. An improved blower unit is mounted on the frame with a crop inlet opening positioned to receive crop material propelled rearwardly. The improvement in the blower unit comprises a fan having a cone-shaped base plate rotatably mounted within the housing in the path of rearwardly propelled crop for deflection thereof outwardly into the periphery of the housing. Blades extend from the plate for rotation in a generally circular path about a generally longitudinal axis through the center of the plate render crop material in an airborne state and propel it upwardly through an outlet in the blower housing.

The improved blower is especially adapted to be mounted in a forage harvester with its axis inclined upwardly and forwardly whereby the fan blades have paths of rotation extending below the cylindrical cutterhead to minimize the distance between the forwardly mounted shear bar and the fan and thereby enhance the overall forage harvester performance.

Another important aspect of the improved blower structure is the ability of the conical base plate to enhance gear box placement. By mounting the fan on the output shaft of the gearbox within the concave area of the plate a compact design with improved bearing load is realized.

The foregoing and other objects, features and advantages of the invention will appear more fully hereinafter

BRIEF DESCRIPTION OF THE DRAWINGS

FIG. 2 is a front view of the forage blower portion of the forage harvester shown in FIG. 1 taken along lines 2—2 of FIG. 1.

FIG. 3 is a rear view of the forage blower shown in FIG. 2.

FIG. 4 is a sectional view along lines 4—4 of FIG. 2.

DESCRIPTION OF THE PREFERRED EMBODIMENT

Figure 1:
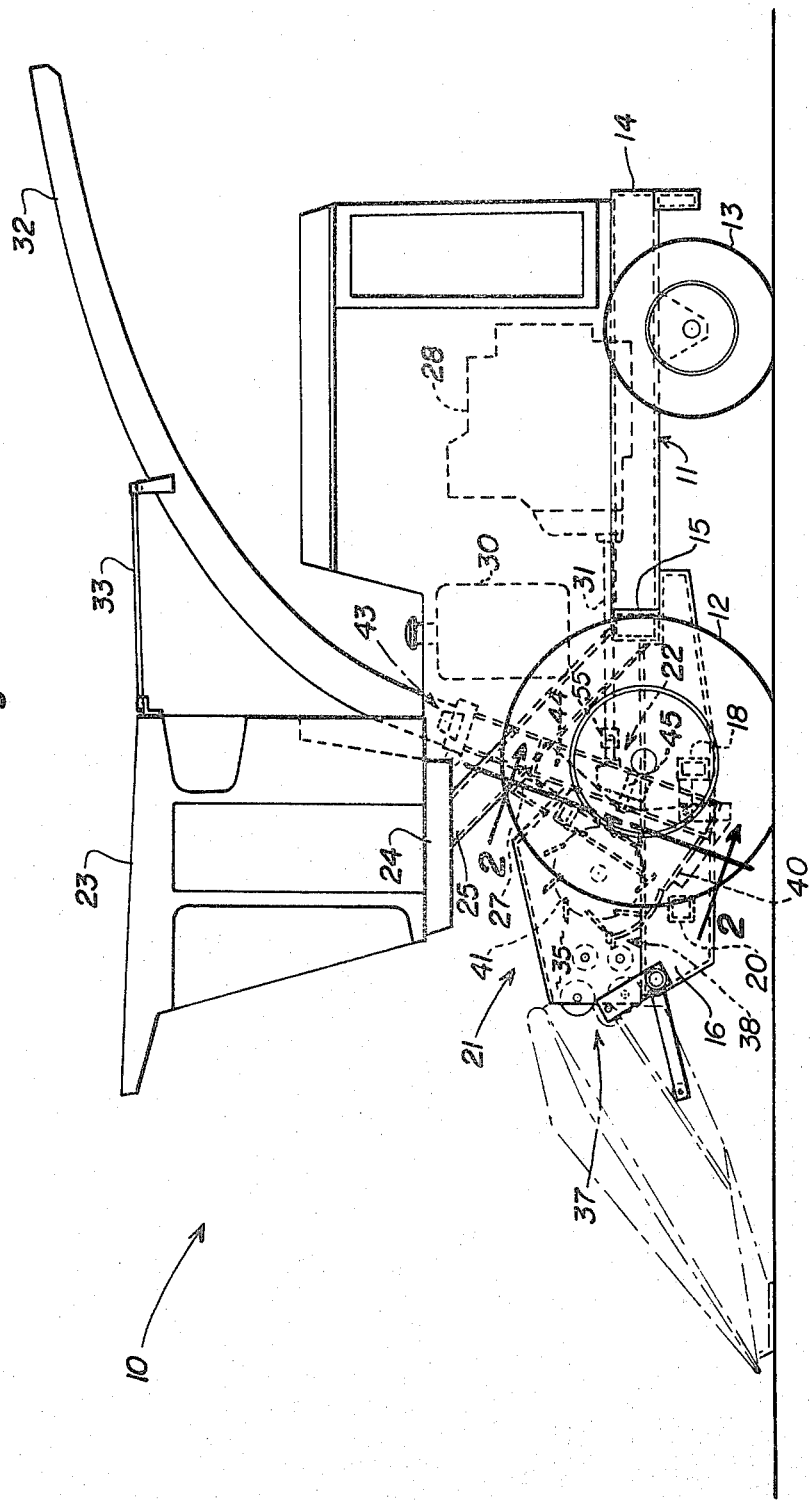
FIG. 1 is a side elevational view of a self-propelled forage harvester showing forage conveying apparatus in which the present invention is embodied.

In the following description, when applicable right-hand and left-hand references are determined by facing the direction of travel of the forage harvester machine.

Referring to the drawings for a detailed description, forage conveying apparatus in the form of a self-propelled forage harvester, generally designated by reference numeral 10, is shown in FIG. 1 to illustrate by way of example one type of equipment in which the present invention is embodied. The forage harvester 10 comprises a plurality of operative components mounted on a generally longitudinally extending frame 11 supported at its forward end by a pair of transversely spaced wheels 12 (only one shown, FIG. 1) and supported rearwardly by a pair of transversely spaced wheels 13 (only one shown, FIG. 1).

The frame comprises several integral members including opposing rear members 14 having forward ends terminating in a cross member 15. A pair of opposing forward members 16 (only one shown) extend from cross member 15 with intermediate cross strut 18 and forward cross strut 20 completing the basic longitudinally extending frame. Mounted on the forward portion of the frame is a cutterhead unit 21 which includes a cutter bar and cutters and a first means for directing the cut crop rearwardly and just rearwardly thereof a blower unit 22 is mounted, both of which are directly below an operator control unit 23 in the form of an enclosed cab extending upwardly from a supporting platform 24. Operator control unit 23 is supported in a cantilever fashion by a pair of opposing support members 25 (only one shown) affixed to and extending upwardly and forwardly from frame cross member 15. Intermediate support members 27 are interposed between opposing forward members 16 and cab support members 25.

Completing the general arrangement of typical components in harvesters of the self-propelled type is power unit 28 and associated fuel tank 30 (both shown in phantom) mounted within the general enclosure configuration rearwardly of the operator control unit 23. The power unit is drivingly coupled to the cutterhead unit and the blower unit and propels the harvester via means commonly known in the art including but not limited to power transmission means, clutching means, drive reversing means, etc. Some power and drive components are schematically shown for illustrative purposes, but are not meant to accurately depict a complete operative system. For example, a shaft 31 is simply shown as extending forwardly from power unit 28 to drive blower unit 22, whereas in practice it is common to utilize a reversing mechanism for the cutterhead and blower drives which would necessarily modify this direct connection.

Also shown in FIG. 1 is a rearwardly and upwardly extending spout 32 for conveying material away from the harvester, a spout support arm 33 extending from the roof of control unit 23, and cutterhead components mounted within side walls 35 of cutterhead unit 21, including feeder assembly 37, a shear bar assembly 38, a transfer chute 40 and a cutterhead 41. These cutterhead components shown in phantom are of a conventional nature and, therefore, further detailed description is not essential for the purpose of this invention.

Now turning to FIGS. 2, 3 and 4, blower unit 22 comprises a housing 42, an outlet transition 43 extending therefrom and a mounting bracket for affixing the unit to intermediate cross strut 18 (FIG. 1) of the harvester frame. The bracket is generally rectangular and consists of inclined frame members 46,47 and cross angle members 48,50. The housing has a generally cylindrical chamber in which a fan 44 is journalled for rotation via a shaft 45. Fan blades 51, attached to unique conical base plate 52, are adapted to receive crop material through an access opening or second means for directing crop material 53 in housing 42 and convey it upwardly to spout 32 via transition member 43 attached to blower housing 42 via U-shaped flange 54. The lower portion of blower housing 42 is below and forward of the path of travel of cutterhead 41 (see FIG. 1). Drive for fan 44 is provided via shaft 31 which transmits rotational force via coupling element 55.

More specifically, the unique conical base plate 52 mentioned above, includes a generally circular support rib 56 affixed to the concave surface of plate 52 between outer circular edge 57 and the vertex of the cone, i.e., the center of the plate. Shaft 45, affixed to the center of the plate, extends outwardly from a gear box assembly 58, which is mounted within housing 42. Gear box assembly 58 is encompassed within a plane through edge 57 and the concave surface of conical plate member 52 to provide a compact structure. Gear box mounting bracket 60 is secured to cross angle members 48,50 to support gear box 58 within opening 61 provided in the back of fan housing 42.

Gear box assembly 58 consists of an input shaft 62 and an output shaft 45, the latter of which is affixed to base plate 52, as mentioned above. Input shaft 62, which is coupled to an external power source via coupling element 55, extends through the gear box and is keyed to gear 65 mounted between associated bearing assemblies 66 and 67. A driven gear 68 is likewise mounted on its associated output shaft 45 journalled in gear box 68 between paired bearing assemblies 70,71. The fan further comprises blades 51 mentioned above which are secured at 90 degree intervals to the top surface of conical base plate 52. Each blade consists of a tapered crop engaging portion 72 extending generally radially from the convex surface of base plate 52 and an integral flange portion 73 secured to base plate 52 by appropriate fastener means such as the nut and bolt assemblies shown. A rear support element 74 having a triangular configuration is affixed between the rear surface of crop engaging portion 72 and the top of flange 73 to provide rigidity to the crop engaging surface.

In operation, harvested crop material is guided to feeder mechanism 37 via a header such as a row crop unit or a windrow pickup unit, both of which are common in the art. A unit of the row crop type is shown in phantom in FIG. 1 for exemplary purposes. Crop material guided between opposing upper and lower feed rolls is fed to shear bar assembly 38 which is mounted in cooperative relation with cutting members on cutterhead 41 to cut the crop material in small particles and propel it downwardly and rearwardly within the enclosed cutterhead unit via chute 40 and thence against conical base plate 52 of blower unit 22. The inclined nature of the outer surface of plate 52 tends to direct particles outwardly while the motion of such surface tends to impart a circumferential component of velocity the net effect being a deflection of crop material outwardly and in the direction of rotation. All particles are ultimately engaged by blades 51 which in turn propel the material along a generally circular path and tangentially out through transition 43 in an airborne state, and finally out spout 32 to a trailing wagon, a mounted bin or the like. It is important to emphasize that the conical shape of base plate 52 provides an inclined moving surface against which cut crop material is propelled and thereby provides an outward and forward component of velocity prior and during engagement of blades 51. This generally outward deflection of crop material is toward the peripheral area of the chamber and the ultimate tangential discharge path and thereby further enhances efficiency and effectiveness.

The unique crop conveying apparatus and particularly the conical shape of the blower unit in the forage harvester discussed above provides many advantages. For example, the gear box can be mounted within the concave area of the plate to provide a compact design with a narrow profile. Furthermore, when mounting the blower fan on the gear box output shaft improved bearing load characteristics are realized.

Implicit and explicit features of the above-described structure underscore the important advantage of forage apparatus whereby crop material propelled through the opening of a blower impacts with a moving surface having a generally advantageous angular relationship with respect to the desired directional velocity of the crop material.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. In a forage harvester:
   (a) a ground supported mobile frame having a front to rear longitudinal axis and a vertical axis
   (b) crop cutting means and means for propelling said cut crop mounted on said frame
   (c) said cut crop propelling means including a first means for directing said crop rearwardly on said longitudinal axis
   (d) blower means mounted on said frame in line with the longitudinal axis rearwardly of said cutting and propelling means for receiving said cut and propelled crop
   (e) said blower means including a propeller having its plane of rotation inclined from the vertical axis and transverse to said longitudinal axis, and
   (f) said blower having a bottom crop receiving means and a top generally vertical crop discharging means and having said propeller when operating moving said cut crop from said bottom crop receiving means upwardly to said top generally vertical crop discharging means, and
   (g) said propeller including a cone means including an apex facing generally toward said crop cutting means for aiding in directing said crop downwardly in said bottom crop receiving means.

2. In a forage harvester as in claim 1 and including:
   (a) second means for directing said crop toward the lower portion of said cone.

3. In a forage harvester as in claim 2 and wherein:
   (a) said second means for directing said crop includes an opening in said blower means having a substantial portion of said opening below the apex of said cone means.

4. In a forage harvester as in claim 3 and wherein:
   (a) said opening includes a small portion above said cone means.

5. In a forage harvester as in claim 1 and wherein:
   (a) said cone means includes a concavity, and
   (b) gear box mounted within said concavity.

6. In a forage harvester as in claim 5 and wherein:
   (a) said gear box includes a stub shaft and a driven gear, and
   (b) means adjacent said driven gear for receiving a drive shaft and drive gear for driving said driven gear.

7. In a forage harvester as in claim 6 and wherein:
   (a) said gear box is entirely encompassed within said concavity.

8. In a forage harvester as in claim 7 and wherein:
   (a) said means for receiving said drive shaft and drive gear for driving said driven gear has its central axis angled with respect to the axis of said stub shaft.

9. In a forage harvester as in claim 5 and wherein:
   (a) said blower means including a back plate covering said concavity.

10. In a forage harvester as in claim 1 and wherein:
    (a) said bottom crop receiving means of said blower means is generally below said crop propelling means.

11. In a forage harvester as in claim 10 and wherein:
    (a) said top generally vertical crop discharging means of said blower means is generally above sais crop propelling means.

12. In a forage harvester as in claim 1 and wherein:
    (a) said top generally vertical crop discharging means of said blower means is generally above said crop propelling means.

* * * * *